(12) United States Patent
Zimmer et al.

(10) Patent No.: US 12,117,383 B2
(45) Date of Patent: Oct. 15, 2024

(54) METHOD AND DEVICE FOR EVALUATING SIGNALS OF A SENSOR UNIT INCLUDING AT LEAST TWO SENSORS

(71) Applicant: Robert Bosch GmbH, Stuttgart (DE)

(72) Inventors: Christoph Zimmer, Korntal (DE); Markus Ulrich, Stuttgart (DE); Philipp Nolte, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 452 days.

(21) Appl. No.: 17/454,999

(22) Filed: Nov. 15, 2021

(65) Prior Publication Data

US 2022/0187179 A1 Jun. 16, 2022

(30) Foreign Application Priority Data

Dec. 11, 2020 (DE) ..................... 10 2020 215 735.9

(51) Int. Cl.
*G01N 11/02* (2006.01)
*G01N 11/00* (2006.01)
(Continued)

(52) U.S. Cl.
CPC ............. *G01N 11/02* (2013.01); *G06N 20/00* (2019.01); *G16Y 40/10* (2020.01); *G16Y 40/35* (2020.01);
(Continued)

(58) Field of Classification Search
CPC ........ G16Y 40/35; G16Y 40/10; G06N 20/00; H04L 67/12; G01N 11/02; G01N 2011/0026
See application file for complete search history.

(56) References Cited

U.S. PATENT DOCUMENTS 7,460,958 B2 * 12/2008 Walsh ................ G01N 33/0034
702/24
8,043,566 B2 * 10/2011 Morris ............... G01N 33/0031
73/23.31
(Continued)

OTHER PUBLICATIONS

Liu et al., "Drift Compensation for an Electronic Nose by Adaptive Subspace Learning," IEEE Sensors Journal, vol. 20, No. 1, 2020, pp. 337-347.
(Continued)

*Primary Examiner* — An H Do
(74) *Attorney, Agent, or Firm* — NORTON ROSE FULBRIGHT US LLP; Gerard A. Messina

(57) ABSTRACT

A method for evaluating signals of a sensor unit including at least two sensors. The method includes reading in a first sensor value of a first of the sensors and a second sensor value of a second sensor, the first and second sensor value each representing one parameter of a substance to be measured by the sensors or a linking of the parameters. A threshold value range is read in, which maps a range of combinations of at least the first and second sensor values, which represents the presence or a value of the substance to be measured in surroundings of the first and second sensors. A combination of the read-in first and second sensor values is recognized as being outside the threshold value range. The threshold value range is changed into a changed threshold value range so that the combination is situated within the changed threshold value range.

17 Claims, 4 Drawing Sheets

(51) Int. Cl.
  *G06N 20/00*    (2019.01)
  *G16Y 40/10*    (2020.01)
  *G16Y 40/35*    (2020.01)
  *H04L 67/12*    (2022.01)
(52) U.S. Cl.
  CPC ...... *H04L 67/12* (2013.01); *G01N 2011/0026* (2013.01)

(56) References Cited

U.S. PATENT DOCUMENTS 11,300,550 B2 * 4/2022 Hsi .................. G08B 21/14
2001/0013026 A1  8/2001 Shaffer
2006/0155486 A1  7/2006 Walsh et al.
2015/0323510 A1  11/2015 Huynh et al.

OTHER PUBLICATIONS

Liu et al., "Active Learning on Dynamic Clustering for Drift Compensation in an Electronic Nose System," Sensors 2019, vol. 19, 2019, pp. 1-15.

Marco et al., "Gas Identification With Tin Oxide Sensor Array and Self-Organizing Maps: Adaptive Correction of Sensor Drifts," IEEE Transactions on Instrumentation and Measurement, vol. 47, No. 1, 1998, pp. 316-321.

Zuppa et al., "Drift Counteraction With Multiple Self-Organising Maps for an Electronic Nose," Sensors and Actuators B 98, 2004, pp. 305-317.

Liang et al., "Study on Interference Suppression Algorithms for Electronic Noses: A Review," Sensors 2018, vol. 18, 2018, pp. 1-26.

\* cited by examiner

METHOD AND DEVICE FOR EVALUATING SIGNALS OF A SENSOR UNIT INCLUDING AT LEAST TWO SENSORS

CROSS REFERENCE

The present application claims the benefit under 35 U.S.C. § 119 of German Patent Application No. DE 102020215735.9 filed on Dec. 11, 2020, which is expressly incorporated herein by reference in its entirety.

FIELD

The present invention is directed to a device and to a method for evaluation signals of a sensor unit including at least two sensors. The subject matter of the present invention is also a computer program.

BACKGROUND INFORMATION

Electronic noses as sensor units for detecting odors/aromas are often formed with the aid of multiple sensors, which have different cross-sensitivities to various substances, as a result of which in the case of a complex mixture of substances to be detected (for example, odors, aromas), the sensors generate identical or also different signals in individual sensors. These signals may be interpreted as a feature in the form of a feature vector. The feature space spanned in the process then corresponds at least to the number of sensors used. The feature vectors may thus be evaluated via a principal component analysis (PCA). In the process, various odors may be found in various point clouds of the feature space, thereby enabling a discriminant and assignment of the odors via cluster algorithms and regression methods.

SUMMARY

A method, a device that uses this method, and a corresponding computer program for evaluation signals of a sensor unit including at least two sensors, are provided. Advantageous refinements of and improvements on the device specified disclosed herein are possible with the measures disclosed herein.

The present invention provided a method for evaluating signals of a sensor unit including at least two sensors. In accordance with an example embodiment of the present invention, the method includes the following steps:

reading in at least one first sensor value of a first of the sensors of the sensor unit and one second sensor value of a second of the sensors of the sensor unit, the first and second sensor value each representing one parameter of a substance to be measured by the sensors or a linking of the parameters, and a threshold value range of the parameters further being read in, which maps a range of combinations of at least the first and second sensor values, which represents the presence or a value of the substance to be measured in surroundings of the first and second sensor;

recognizing that one combination of the read-in first and second sensor values is outside the threshold value range; and changing the threshold value range into a changed threshold value range in such a way that the combination of the read-in first and second sensor values is within the changed threshold value range, in particular, the change of the threshold value range being carried out when the combination of the read-in first and second sensor values meets a change criterion.

A sensor unit in the present case may be understood to be a sensor, which includes at least two sub-sensors, which measure one physical parameter each and which provide this parameter, a value derived therefrom or a linking of these parameters to one another as a respective sensor value. This sensor value may, for example, represent a parameter such as a concentration, an absolute amount, a temperature or similar value of a substance to be measured, which is located in surroundings of the first and second sensor, i.e., of a respectively relevant sub-sensor. A substance to be measured may be understood to mean, for example, a gas, a proportion of a gas in a gas mixture, for example, air, or for example, also a proportion of particles in surroundings or in a gas mixture around the respectively relevant sensors. A combination of at least the first and second sensors may, for example, be understood to mean a tuple, in which the first and second sensor value each form an object of this tuple. A threshold value range may, for example, be understood to mean a range of combinations of the first and second sensor values, which forms a limit, after which the presence or the value of the substance to be measured is no longer able to be mapped or identified. A change criterion may, for example, be understood to mean a criterion, which indicates that the combination of the read-in first and second sensor values is outside the threshold value range by no more than a predefined distance value.

The approach provided herein is based on the finding that specifically for sensor units that include multiple separately measuring sensors, a simple, automatic calibration of the sensors of this sensor unit or of the sensor unit itself may take place if it is recognized that, for example, the combination of the first and second sensor value are outside the threshold value range, but still also meet the change criterion. In this way, it is possible, for example, to recognize and to compensate for a drift of the sensor sensitivity, which is caused, for example, by an ageing of the sensor or of the sub-sensors or by the operation with a voltage different from the originally provided voltage. The sensor unit or the sub-sensors or sensors then do not need to be laboriously manually calibrated, rather a tracking of the sensitivity or calibration of the sensors may be carried out mechanically and in an automated manner which, over the service life of the sensor unit, allows for a preferably constant precision of the measured values of this sensor unit on the one hand, as well as a significant reduction in the effort required for the operation of such a sensor unit.

One specific embodiment of the present invention is particularly advantageous, in which in the step of reading in a threshold value range is read in, which represents a range in a sensor value space spanned by the at least first and second sensor values. Such a specific embodiment of the approach provided herein yields the advantage of being able to carry out a precise measurement of the parameter of the substance to be measured by using a sensor value space configured in this way, since metrologically-related variations of the first and second sensor values, for example, are able to be considered and the relevant value or the presence of the substance to be measured is still able to be precisely identified.

One specific embodiment of the present invention is also advantageous, in which the steps of reading in, or recognizing and of changing are carried out repeatedly, it being recognized in the repeatedly carried out step of recognizing that a combination of the first and second sensor values read in in the repeatedly carried out step of reading in is outside the changed threshold value range. Such a specific embodiment yields the advantage of a continuous supervision of the position of the combinations of the first and second sensor values, so that a renewed calibration may promptly take place by changing the threshold value range.

According to one particularly advantageous specific embodiment of the present invention, one first operating parameter each or one second operation parameter each may further be read in in the step of reading in and of the repeatedly carried out step of reading in, the first operating parameter representing an instantaneous operating state of the first sensor and/or an instantaneous operating state of the second sensor and/or the second operating parameter representing an operating state of the first sensor and/or an operating state of the second sensor for a subsequent point in time, and further in the step of changing the threshold value range is changed if the first operating parameter read in in the step of reading in deviates by more than a predefined tolerance value from the second operating parameter read in in the repeatedly carried out step of reading in. A tolerance range or tolerance value may, for example, be understood to mean a deviation of 10% of the value of the (originally read-in) operating parameter. Such a specific embodiment yields the advantage that by considering the operating parameter during the calculation, a piece of information that a use scenario for the sensor unit has changed may also be considered.

Such a piece of information gives a quite clear indication that in the new use environment of the sensor unit, the sensor values in the presence of the substance to be measured potentially no longer correspond to those sensor values for which the previously used threshold value range applied, so that now a calibration or readjustment of this threshold value range is required.

According to one specific embodiment of the present invention, a piece of information about an operating voltage and/or an operating temperature and/or an age of the first and/or second sensor may be read in in the step of reading in as a first and/or second operating parameter. Such a specific embodiment yields the advantage that the operating voltage, operating temperature and/or the age of the respective sensors, in particular, represent an operating parameter that has a significant influence on the output of a corresponding sensor value, so that a change of this aforementioned specific operating parameter very likely also makes it necessary to adapt the threshold value range for a precise measurement of the parameter of the substance to be measured.

In order to carry out a preferably continuous supervision of the precision of the sensor unit or of the tracking or calibration of the sensor unit, sensor values or operating parameter values to be compared with one another should be compared, which have been successively detected within a not excessively long time interval. For this reason, it is possible according to one particularly advantageous specific embodiment of the present invention to use one first sensor value, one second sensor value, one first operating parameter and/or one second operating parameter in the step of recognizing for recognizing the combination of the read-in first and second sensor values outside the threshold value range, if the first sensor value, the second sensor value, the first operating parameter and/or the second operating parameter has/have been recorded at a point in time, which is temporally not more than a predefined time span prior to an instantaneous point in time.

One specific embodiment of the present invention is particularly advantageous, in which the step of changing is carried out when, as the change criterion, the combination of the read-in first and second sensor values is outside the threshold value range by no more than a predefined or relative distance value. For example, such a distance value may be selected in such a way that a uniformly distributed safety range is enclosed around the threshold value range, which corresponds to half, in particular to at most 20% of the threshold value range. This may ensure, in this way, that even in the case of larger deviations of the combination of the first and second sensor values from the threshold value range, no change of this threshold value range and thus no calibration of the sensor unit takes place if actually a clear and unambiguous measurement of the non-existence or of no present value of the substance to be measured by the sensor unit has taken place.

According to one further specific embodiment of the present invention, the step of changing the threshold value range may be carried out using an algorithm with artificial intelligence and/or an algorithm of a machine learning method. Such a specific embodiment of the approach provided herein yields the advantage of a very precise and simple option of calibrating the sensor unit by changing the threshold value range.

One specific embodiment of the present invention is further possible, in which the step of changing is carried out in response to a user input signal, which represents a manual user input. In this case, the user input signal may be read in in response to a recognition signal output in the step of recognizing, which represents a recognition of a combination of the read-in first and second sensor values outside the threshold value range. Such a specific embodiment of the present invention herein yields the advantage of being able to carry out the calibration of the sensor unit or the prevention of the threshold value range only if a user of the sensor unit has also actively consented. In this way, a supervision of the calibration of the sensor unit by a user may be advantageously implemented.

One specific embodiment of the present invention is particularly advantageous, in which in the step of reading in, the first and/or second sensor value is/are read in as a measured value and/or as a processed measured value from a gas sensor and/or from a sensor for measuring particles in a fluid, in particular, in a gas. A continuous supervision is advantageous specifically for the measurement of gases or of particles in gases, since drifts of sensor values are particularly critical in such sensors.

One specific embodiment of the present invention is particularly advantageous, in which not only a substance to be measured, but also, for example, a further substance to be measured is to be detected and evaluated by the sensor unit. For example, this further substance to be measured may be a second gas or a second substance to which the sensor unit is sensitive. Thus, according to one particularly advantageous specific embodiment of the approach provided herein, at least one further threshold value range may be further read in in the step of reading in, which maps a range of combinations of at least the first and second sensor values, which represents the presence or a value of the further substance to be measured in surroundings of the first and second sensors, it being recognized in the step of recognizing that a combination of the read-in first and second sensor values is outside the further threshold value range, and in the step of changing, the further threshold value range being changed into a changed further threshold value range in such a way that the combination of the read-in first and second sensor values is within the changed further threshold value range. Such a specific embodiment of the approach provided herein yields the advantage of being able to provide in a sensor, which is sensitive to multiple substances to be measured differing from one another, an automatic calibration of the evaluation of the sensors for each substance to be measured. In this way, it is also possible to automatically recognize and compensate for a different drift behavior of the sensors for the respective substance to be measured.

One specific embodiment of the present invention is also possible, in which in the step of reading in, at least one third sensor value of a third of the sensors of the sensor unit and a fourth sensor value of a fourth of the sensors of the sensor unit may further be read in, the third and fourth sensor value each representing one parameter of the substance to be measured by the sensors, and further in the step of recognizing, it being recognized that a combination of the read-in third and fourth sensor values is outside the threshold value range, and in the step of changing, the threshold value range being changed into a changed threshold value range in such a way that the combination of the read-in third and fourth sensor values is within the changed threshold value range. The third sensor and/or the fourth sensor in this case may be sub-sensors of the first and/or second sensor or may also represent separate sensors completely independent of the first and/or of the second sensor. By using multiple sensors, i.e., in this case using the third and fourth sensors together with the associated sensor values, it is possible to then achieve a particularly reliable recognition of the substance to be measured, since a measuring inaccuracy in one of the sensor values provided by the sensors may be easily compensated for.

This method may, for example, be implemented in software or in hardware or in a mixed form of software and hardware, for example, in a control unit.

The present invention further provides a device, which is designed to carry out, activate or implement the steps of a variant of a method disclosed herein in corresponding units. With this embodiment variant of the present invention in the form of a device as well, it is possible to quickly and efficiently achieve the object underlying the present invention.

For this purpose, the device may include at least one processing unit for processing signals or data, at least one memory unit for storing signals or data, at least one interface to a sensor or to an actuator for reading in sensor signals from the sensor or for outputting data signals or control signals to the actuator and/or at least one communication interface for reading in or outputting data, which are embedded in a communication protocol. The processing unit may, for example, be a signal processor, a microcontroller or the like, the memory unit capable of being a flash memory, an EPROM or a magnetic memory unit. The communication interface may be designed to read in or output data wirelessly and/or in a hardwired manner, a communication interface, which is able to read in or output hardwired data, being capable, for example, of reading in these data electrically or optically from a corresponding data communication line or outputting these data into a corresponding data communication line.

A device in the present case may be understood to mean an electrical device which processes sensor signals and, as a function thereof, outputs control signals and/or data signals. The device may include an interface, which may be designed in hardware and/or in software. In a hardware design, the interfaces may, for example, be part of a so-called system ASIC, which contains a wide variety of functions of the device. It is also possible, however, for the interfaces to be separate, integrated circuits or to be made at least partly of discrete components. In a software design, the interfaces may be software modules, which are present, for example, on a microcontroller alongside with other software modules.

Also advantageous is a computer program product or computer program including program code, which may be stored on a machine-readable medium or memory medium, such as a semiconductor memory, a hard disk memory or an optical memory, and which is used for carrying out, implementing and/or activating the steps of the method according to one of the previously described specific embodiments, in particular, when the program product or program is executed on a computer or a device.

BRIEF DESCRIPTION OF THE DRAWINGS

Exemplary embodiments of the present invention are represented in the figures and explained in greater detail in the following description.

DETAILED DESCRIPTION OF EXAMPLE EMBODIMENTS

Figure 1:
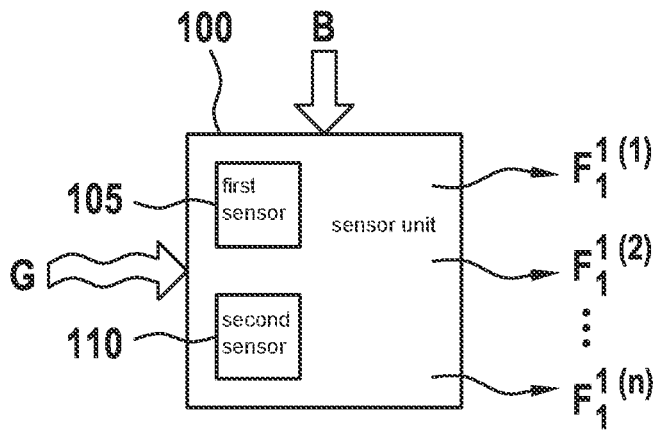
FIG. 1 schematically shows a representation of one exemplary embodiment of a sensor unit, as it may be used in conjunction with the present invention.

In the following description of preferred exemplary embodiments of the present invention, identical or similar reference numerals are used for elements which are represented in the various figures and act similarly, a repeated description of these elements being omitted.

FIG. 1 schematically shows a representation of one exemplary embodiment of a sensor unit 100 as it may be used in conjunction with the approach presented herein. Sensor unit 100 in this embodiment includes at least one first sensor 105 and one second sensor 110, still further sensors, however, also being capable of being included in this sensor 100 which, however, for the sake of clarity of the approach presented herein are not further described in FIG. 1. The approach presented herein may still also be implemented using more than two sensors. Furthermore, at least one sensor value F1 and one second sensor value F2 is provided by sensor unit 100, first sensor value F1 representing, for example, a parameter of a substance G to be measured by first sensor 105, and second sensor value F2 representing, for example, a parameter of a substance G to be measured by second sensor 110. This substance G to be measured may be a gas or a gas component in an atmosphere, this form of the substance to be measured, however, not having to restrict the generality of the approach described herein. It is also possible that the substance to be measured is a solid or particulate substance or represents a liquid or a component of a liquid in a liquid mixture. In the present described exemplary embodiment, however, substance G to be measured is considered to be a gas, which impacts first and second sensors 105 and 110 of sensor unit 100 and results in sensor values F1 and F2.

Sensor values F1 and F2 in this case are detected taking a specific operating parameter B into consideration, which represents, for example, a specific operating mode of sensor unit 100 or a piece of information about a property of sensor unit 100. For example, such an operating parameter may map an age of sensor unit 100 or of first sensor 105 and/or of second sensor 110, and may be linked to sensor values F1 and F2, so that the age of sensors 105 or 110 providing sensor values F1 and F2, respectively, is apparent. It is also possible, however, that this operating parameter B maps an operating temperature of sensors 105 or 110 or that this operating parameter maps a voltage or heating voltage $U_H$, which is present at sensors 105 or 110 and, for example, maps a heating of a detecting element required for the measurement of substance G to be measured.

If sensors 105 or 110 of sensor unit 100 are acted on with a gas G as the substance to be measured in the case of a particular operating mode or a particular operating parameter B, a feature vector F is generated with sensor values F1 and F2 present here. In the following description, a sensor value $F_1^{1(1)}$, which has been measured at a first point in time taking a first operating parameter B1 into consideration, is referred to for the sake of better clarity simply as F1, whereas, for example, a sensor value $F_2^{1(2)}$, which has been measured by the second sensor at a first point in time taking a first operating parameter B1 into consideration, is referred to simply as F2. Similarly, the first and second sensor values, which are then measured at a second point in time taking a first operating parameter B1 into consideration may be referred to as $F_1^{2(1)}$ and $F_2^{2(1)}$, and the first and second sensor values, which are measured at a first point in time taking a second operating parameter B2 into consideration, may be referred to as $F_1^{1(2)}$ and $F_2^{1(2)}$. In order not to always consider a piece of information unnecessary for understanding the procedure according to the approached presented herein, the following description of the procedure is focused solely on the use of sensor values F1 and F2, the respective general conditions in the corresponding situation being cited.

These sensor values F1 and F2 may, however, also have been processed, which are obtained, for example, by a processing of the parameters provided by a detecting element of sensors 105 or 110 themselves, for example, by a differentiation, an integration or the like. It is also possible that to obtain these sensor values F1 and F2, the measured values of multiple sensors are linked to one another, so that, for example, first sensor value F1 results not only from measured results provided by first sensor 105 and, for example, second sensor value F2 results not only from measured results provided by sensor 110. It is further also possible that further sensor values Fn are provided by the sensor unit, whether more than two sensors in sensor unit 100 provide measured values or the measured values are linked to one another to form different combinations. At the same time, different measured values may be recorded by sensors 105 or 110 in temporal succession and may be processed and output to form corresponding sensor values F1 or F2, which may then be characterized with different figures as an index, for example, for identifying their temporal sequence, as has been already briefly addressed above.

Figure 2:
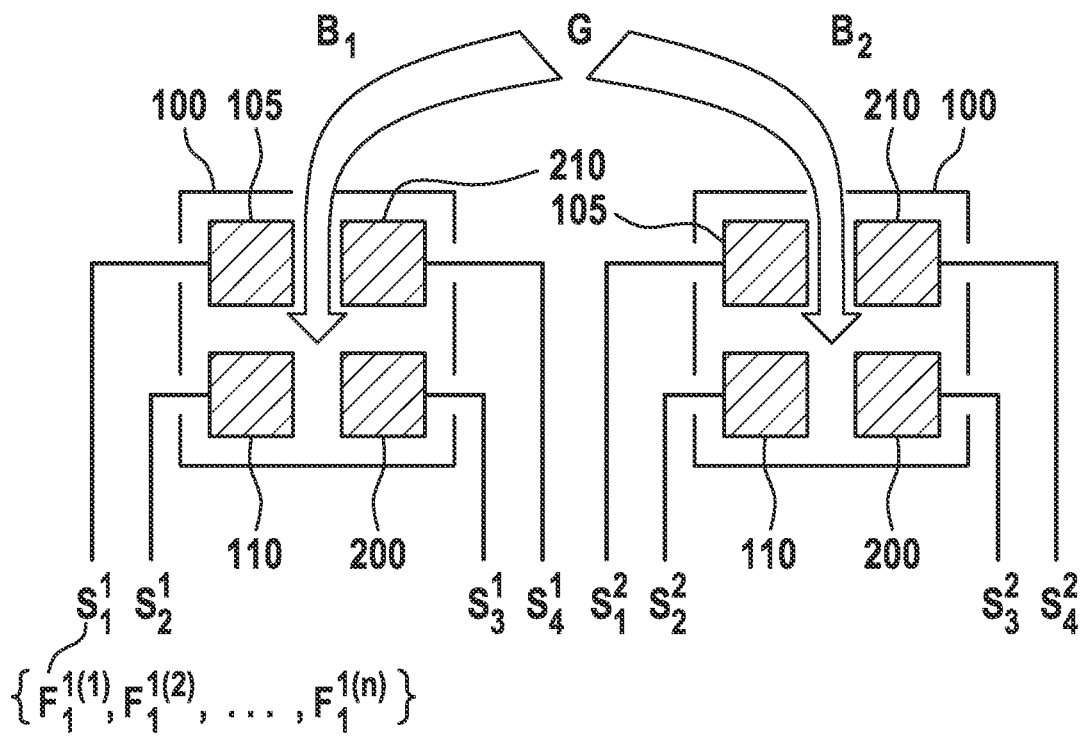
FIG. 2 schematically shows a comparison of the operating mode of the sensor unit in different scenarios, which differ, for example, by different operating parameters.

FIG. 2 schematically shows a comparison of the operating mode of sensor unit 100 in different scenarios, which differ, for example, by different operating parameters B1 and B2. For example, sensor unit 100 in the left partial representation from FIG. 2 may be operated in one operating mode, in which operating parameter B1 denotes a first temperature and/or a first age of sensors 105 or 110, whereas sensor unit 100 in the right partial representation from FIG. 2 is operated in an operating mode, in which operating parameter B2 denotes a second temperature and/or a second age of sensors 105 or 110. In both cases represented, sensor unit 100 is acted on in each case by the same substance G to be measured, here for example, an identical gas, so that the resulting measured values, otherwise given the same surroundings conditions, should also be comparable with one another. In the first measuring scenario at a first measuring point in time 1, for example, in which sensor unit 100 is operated in an operating environment specified by first operating parameter B1, a first measured value $S_1^1$, is output by first sensor 105, a second measured value $S_2^1$ is output by second sensor 110, third measured value $S_3^1$ is output by a third sensor 200 and a fourth measured value $S_4^1$ is output by a fourth sensor 210. From this, it is then possible, for example, to generate and output feature vector F of sensor values $F_1^1, F_2^1, \ldots, F_n^1$. On the other hand, in the second measurement scenario at a second measuring point in time 2, in which sensor unit 100 is operated in an operating environment specified by second operating parameter B2, a first measured value $S_1^2$ is output by first sensor 105, a second measured value $S_2^2$ is output by sensor 110, third measured value $S_3^2$ is output by a third sensor 200 and a fourth measured value $S_4^2$ is output by a fourth sensor 210. From this, it is then possible, for example, to again generate and output a corresponding feature vector F of the sensor values which, for reasons of clarity, is not further depicted in FIG. 2.

FIG. 2 sensors generate signals $S_1^1, S_1''$, or $s_2^1, \ldots S_2^m$ and in the process, may be operated with different operating parameters B1, B2, etc. (if necessary, on different circuit boards), and thus generate different features $\{F_1^{1(1)}, \ldots F_1^{1(n)}\}$ depending on gas G.

Figure 3A:
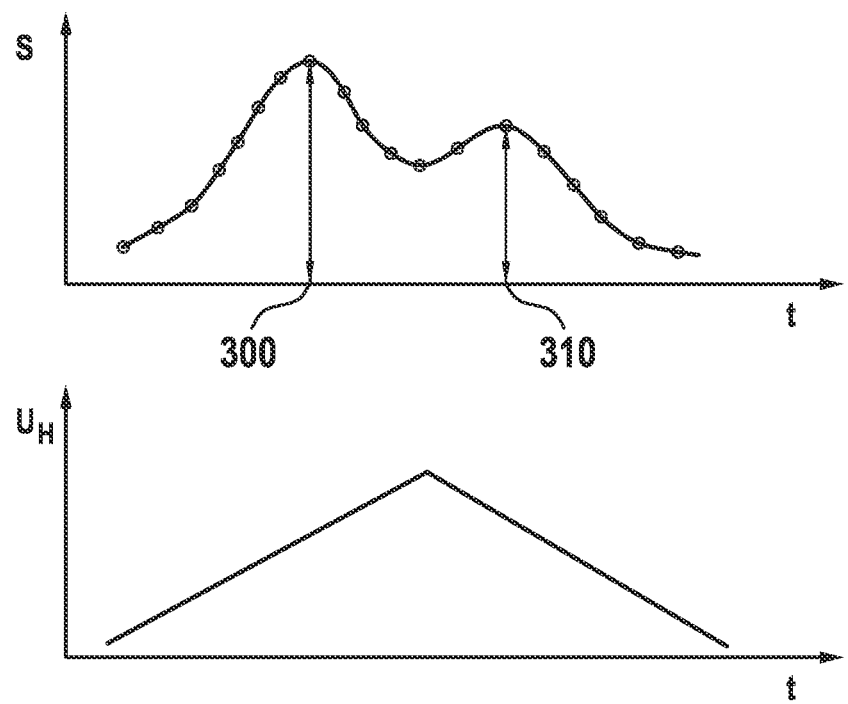
FIGS. 3A and 3B each depict two diagrams in which the effect of a change of one operating parameter over time is represented on the measuring signals provided by the detecting elements of the sensors.
Figure 3B:
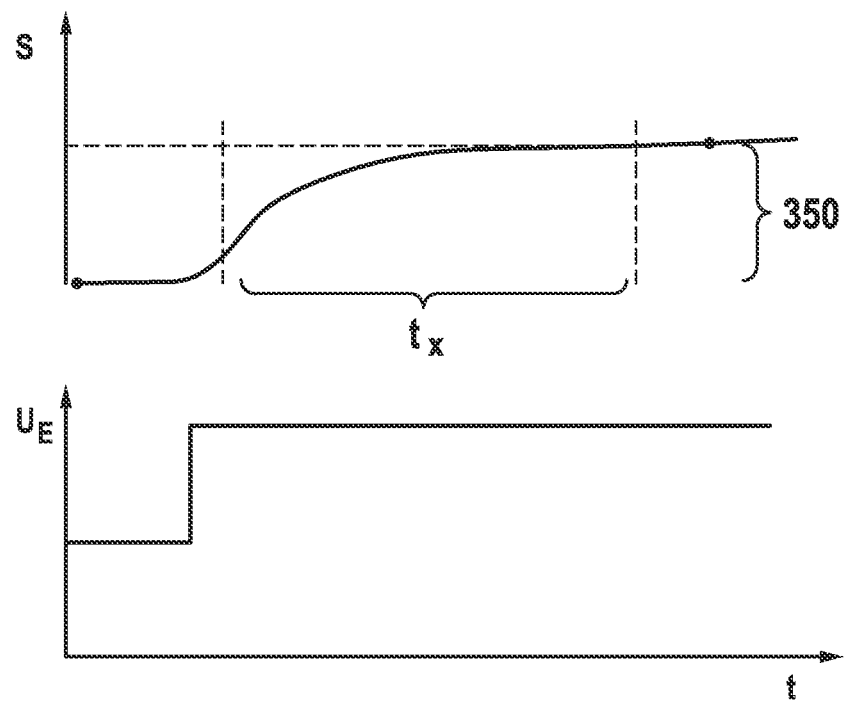

FIG. 3 shows in second sub-FIGS. 3A and 3B two diagrams each, in which the effect of a change of an operating parameter B over time on measuring signals S provided by the detecting elements is represented. FIG. 3A in this case shows in the upper sub-diagram the profile of measuring signal S over time if, for example, an operating temperature of the detecting element of the first relevant sensor is changed in accordance with the temporal profile according to the lower sub-diagram, this operating temperature being represented in the shape of a ramp of heater voltage $U_H$. It is apparent that in this case, the measuring signal includes two local maxima at points in time 300 and 310. FIG. 3B shows in the upper sub-diagram the profile of measuring signal S over time when, for example, a jump of a voltage UE at a measuring electrode according to the lower sub-diagram is changed. It is apparent in this case that after a time span $t_x$, the value of measuring signal S is increased by a value corresponding to distance 350. The sub-figures of FIG. 3 thus show the effects of various operating parameters here, for example, operating temperatures (for example, in the form of a ramp of heater voltage $U_H$) or jumps at electrode $U_E$ on the measuring signals S.

Figure 4:
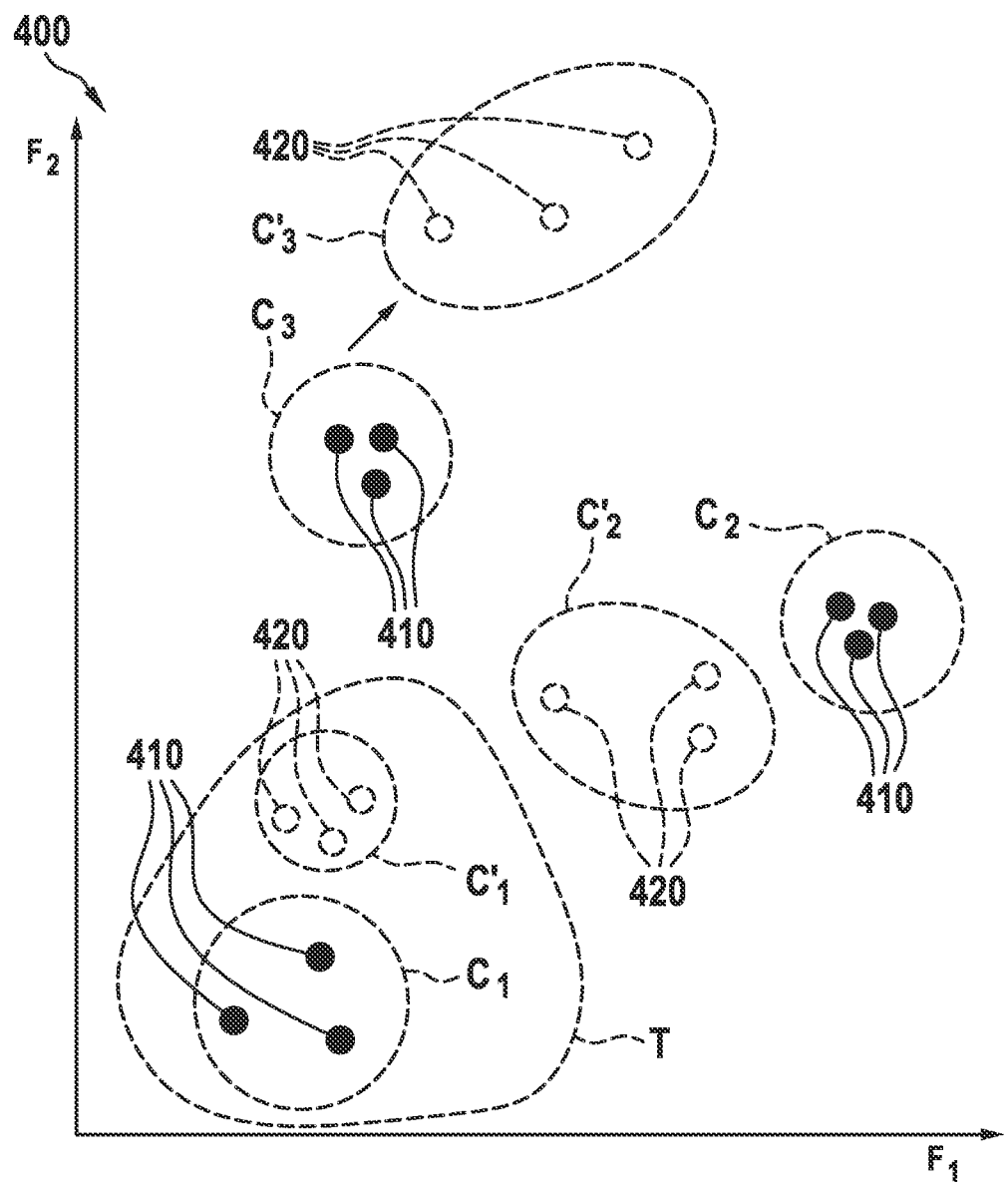
FIG. 4 shows a diagram for explaining the operating mode of an example embodiment of the present invention.

FIG. 4 shows a diagram for explaining the operating mode of the approach presented herein. In this case, the diagram represented in FIG. 4 is represented as an n-dimensional feature space 400 (which may also be referred to as a sensor value space), here with the dimension n=2. In feature space 400, combinations 410 of first sensor values F1 plotted on the x-axis and second sensor values F2 plotted on the y-axis are represented as tuples or coordinates, the sensor values serving practically as coordinate components of combinations 410. If it is then recognized that a combination 410 is within a threshold value range C1, it may, for example, be concluded that sensors 105 or 110 of sensor unit 100 have been acted on by a first substance G to be measured (such as, for example, gas G). In contrast, if a combination 410 is within a second threshold value range C2, it may be assumed therefrom that the sensors of sensor unit 100 have been exposed to a second substance G to be measured; similarly, it is also true that in the event combination 410 is within, for example, a third threshold value range C3, the sensors of sensor unit 100 have been exposed to a third substance G to be measured. It is also possible, however, that second threshold value range C2 and/or third threshold value range C3 is/are ascertained for combinations of a third sensor value and of a fourth sensor value, the third sensor value, for example, being ascertained using third measured value S3 represented and/or described in FIG. 2, and/or the fourth sensor value being ascertained using fourth measured value S4. This is advantageous, in particular, when third sensor 200 and fourth sensor 210 are sensitive to another substance to be measured in contrast to first sensor 105 and second sensor 110. In this way, different sensors, which are sensitive to different substances to be measured, may be installed in a shared sensor unit 100, so that each of these substances to be measured may nevertheless be identified with a high degree of precision.

If, for example, according to the left partial representation from FIG. 2, sensor unit 100 is now operated under a changed operating parameter B2, (for example, with a significantly higher age of the sensors, with a changed temperature of the sensors and/or with a changed voltage supply of the sensors), this may now result in combinations 420 of sensor values F1 and F2 being obtained in feature space 400, which are no longer within threshold value range C1, within second threshold value range C2 and/or within third threshold value range C3, and thus it is no longer possible to recognize that the substance to be measured, the second substance to be measured and/or the third substance to be measured is/are present at the respective sensor. In order to nevertheless be able to provide such a piece of information about the presence of the substance to be measured at the sensor, threshold value range C1 may be changed into a changed threshold value range C1', second threshold value range C2 into a changed threshold value range C2' and/or third threshold value range C3 into a third changed threshold value range C3'. In this way, it is now possible also in the operation of the sensor unit in a use environment of changed operating parameter B2 to reliably recognize or identify the presence (or a parameter) of substance G to be measured, of the second substance to be measured and/or of the third substance to be measured. Such a change of the threshold value into a changed threshold value may be carried out, for example with the aid of an algorithm of artificial intelligence or of a machine learning method. However, in order to ensure that combinations 410 are still assigned to the substance to be measured, even in the case of changed operating parameter B2, and not to the further substance to be measured, a tolerance range T may, for example, also be provided around threshold value range C1, which indicates how far outside threshold value range C1 relevant combination 410 may still be located, so that this threshold value range C1 may be changed into changed threshold value range C1'. This may avoid an erroneous training of the recognition of the substance to be measured on a second substance to be measured.

Thus, it may be summarized that the components or combinations 410 of the sensor values form dot clusters in the n-dimensional feature space from the correspondingly formed feature vectors, this feature space also capable of being referred to as sensor value space 400. These (dot) clusters may change with time with respect to size, position, shape, focus, etc. The change of the features or, in this case, sensor values F is conditioned by the fact that these values are generally unambiguous and constant only in a strictly specified structure which, however is not provided in many use environments. Changing conditions such as, for example, other boundary conditions (for example, operating parameters, ageing phenomena or also exterior boundary conditions such as, for example, the size of the space in which such a sensor is used) may result in a shift of the feature point clouds, of their focus and of their shape. This may result in misinterpretations. Moreover, the use in such cases necessitates frequent recalibrations of the sensors.

In order to nevertheless enable an unambiguous recognition of a substance to be measured, such a "movement" of the feature cluster may take place by a tracking of threshold value ranges (for example, C1→C1'), for example, using an algorithm about adaptive learning methods or an algorithm of artificial intelligence.

With the aid of methods from machine learning, the changing conditions may thus be recognized and the features or threshold value ranges C may be readapted. As a result, a user-independent and universal use, for example, of such an electronic nose may be made possible without frequent interventions and recalibrations by a user. In addition, any post-calibration may be simplified and an increased accuracy may be achieved.

One exemplary embodiment of a complete sequence of the approach presented herein is described in greater detail below. The features or sensor values initially as before (as described above, for example) are initially taught via a main component analysis/cluster method). The assignments found are subsequently repeatedly tested with the aid of adaptive learning methods and adopted in a training set. In the process, it is first checked to what extent the feature found deviates from the set of the previous features and assessed via a suitable metric. If the result is within a tolerated confidence range (for example, within tolerance range T), the result is then adopted. By contrast, if the result is outside the previous confidence interval, the user is then prompted to manually confirm or verify the result found. The result (regardless of whether it confirms or contradicts the algorithm prediction) is added, for example, to the pool of training data and the prediction model is updated. To enable an adaptation to changed conditions (for example, ageing), only the most current 80% or 60% or 40% etc. of the previous training set, for example, is ever maintained. Older data are discarded. For example, this may also take place by providing a time span, which the sensor values may not exceed in terms of maximum age. The confidence range may also be defined, for example via the uncertainty in the prediction. If a Gaussian process is used as a model of machine learning, then the predictive variance assumes this function.

Such an exemplary approach enables a permanent tracking of the threshold value range, which is able to compensate both for changed external boundary conditions as well as intrinsic effects such as, for example, ageing effects such as, for example, a signal drift.

The complexity of the feature space or of sensor value space 400 and thus the discriminant, may be increased in this case in that (a) multiple sensors such as, for example, sensors 105, 110, 200 and/or 210 having different response behaviors (for example, sensitivities to a particular target substance as the substance to be measured) generate various sensor signals S1, S2, . . . , Sn. These sensors in this case may be operated individually or in groups with various operating parameters, which may either be static, but also dynamic (for example, voltage jumps—or ramps at the electrode or at the heater). As a result, for example, static or dynamic features (for example, response times, peaks, initial and end levels of signals and their amplitude) $\{F_1^{1(1)}, F_1^{(2)1}, \ldots F_1^{(k)1}\}$ of an individual sensor are generated. The entirety of all features of all sensors then forms an input variable as feature vector F for the feature recognition and feature assignment.

Heat ramps and/or voltage jumps, for example, may be used as various operating modes B. The features are then entered in the n-dimensional features- or sensor value space 400 (for example, in the combination of the sensor values in feature vector F and operating parameters B) and assigned via cluster algorithms. These features may now shift with time (for example, C1→C1') as previously described.

The features or combinations 410 thus shifted are now tracked, for example, via our adaptive learning methods. Since this tracking sometimes takes place during use (i.e., for example, after delivery by operating personnel), it is important to keep the effort as minimal as possible. Therefore, it is important to not have all feature combinations assessed by personnel, but only those that convey the largest amount of information possible. This role is fulfilled by an active learning algorithm. An active learning algorithm uses, for example, an information measure (for example, predictive variance in Gaussian processes), in order to select which feature combination is to be assessed next.

The aforementioned tracking then functions particularly well if events occur over a measuring time period, which generate $C_i$, $C_i'$. The recognition and tracking may then take place automatically, the active learning algorithm expressing an assessment request once the information is above a predefined information threshold.

In addition, an active learning algorithm is also able to formulate a targeted request for feature combinations. In this case, or if events to be detected very seldom occur (for example, at an interval of multiple months or years) or the variety of actually occurring events is very small, it may be helpful to offer an option for a simplified recalibration. In contrast to a complex calibration, the simplified recalibration is characterized by:
1. it takes place at the location of the usual place of installation:
   no disassembly and transport to a calibration laboratory
   no offer of a protective atmosphere with a known gas background, but utilization of the basic atmosphere prevailing on site.
2. no complex test gases are to be used, but rather the real-life situation may be directly reconstructed in a qualitative test (for example, particular types of food are placed in the measuring room; bottle with solvent is opened, etc.). Such a test procedure could be carried out by laypersons, no experts required.
3. in order to obtain corrected position $C_j'$ as opposed to an original position $C_j$, event j may, but does not necessarily have to be, imitated. It is also possible to use other events k, l, m . . . , whose point clouds $C_k$, $C_l$, $C_m$ . . . are in the environment of point cloud $C_j$, in order to deduce via $C_k'$, $C_l'$, $C_m'$ the position of $C_j'$.

Figure 5:
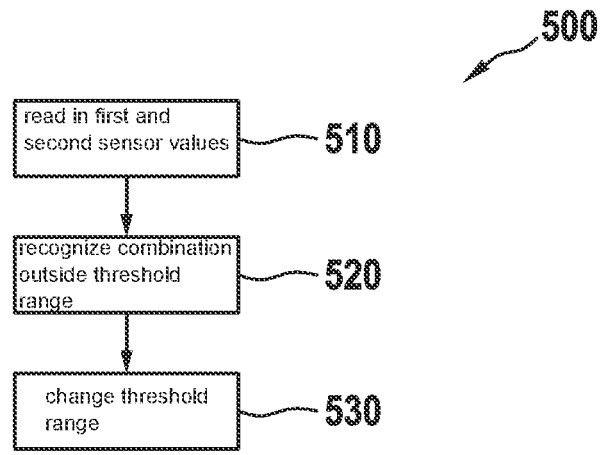
FIG. 5 shows a flowchart of a method according to one exemplary embodiment of the present invention.

FIG. 5 shows a flowchart of one exemplary embodiment of a method 500 for evaluating signals of a sensor unit including at least two sensors. Method 500 includes a step 510 of reading in at least one first sensor value of a first of the sensors of the sensor unit and of one second sensor value of a second of the sensors of the sensor unit, the first and second sensor value each representing one parameter of a substance to be measured by the sensors or a linking of the parameters, and a threshold value range further being read in, which maps a range of combinations of at least the first and second sensor values, which represents the presence of the substance to be measured in surroundings of the first and second sensor. Method 500 further includes a step 520 of recognizing that a combination of the read-in first and second sensor values is outside the threshold value range. Finally, method 500 includes a step 530 of changing the threshold value range into a changed threshold value range in such a way that the combination of the read-in first and second sensor values is within the changed threshold value range, the change of the threshold value range then being carried out when the combination of the read-in first and second sensor values meets a change criterion.

Figure 6:
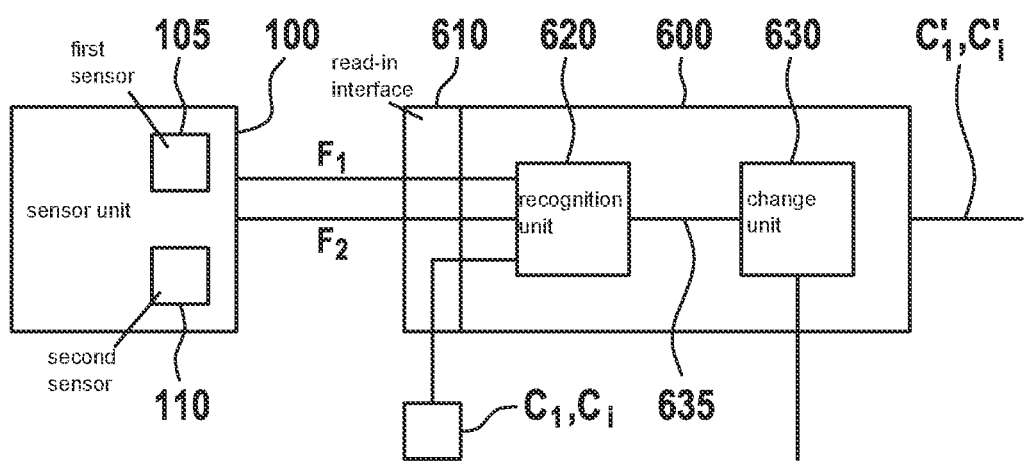
FIG. 6 shows a block diagram of a device according to one exemplary embodiment.

FIG. 6 schematically shows a block diagram of one exemplary embodiment of a device 600 for evaluating signals of a sensor unit 100 including at least two sensors 105 and 110. Device 600 includes a read-in interface 610 for reading in at least one first sensor value of a first of the sensors of the sensor unit and one second sensor value of a second of the sensors of the sensor unit, the first and second sensor value each representing one parameter of a substance to be measured by the sensors or a linking of the parameters, and read-in interface 610 further being designed to read in a threshold value range $C_i$, $C_i$, which maps a range of combinations of at least the first and second sensor value, which represents the presence of the substance to be measured in surroundings of the first and second sensor. Device 600 further includes a unit 620 for recognizing that a combination of the read-in first and second sensor values is outside the threshold value range and a unit 630 for changing the threshold value range $C_i$, $C_i$ into a changed threshold value range $C_i'$, $C_i'$ in such a way that the combination of the read-in first and second sensor values is within the changed threshold value range, in particular, the change of the threshold value range being carried out when the combination of the read-in first and second sensor values meets a change criterion. It is also possible that unit 620 for recognizing outputs a recognition signal 635, in order to signal that a combination of the read-in first and second sensor values outside the threshold value range has been recognized, and in response thereto, a user input signal 640 is read in in unit 630 for changing, which represents a manual user input. In this way, it may be checked or confirmed once again by a user that the threshold value range is actually to be changed.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:
1. A method for evaluating signals of a sensor unit including at least two sensors, the method comprising:
   detecting at least one first sensor value, via a first sensor of the sensors of the sensor unit, and detecting at least one second sensor value of a second sensor of the sensors of the sensor unit;

reading in, via a read-in interface: (i) the at least one first sensor value and the at least one second sensor value, each of the first and second sensor values representing one parameter of a substance to be measured by the sensors or a linking of the parameters, and (ii) a threshold value range which maps a range of combinations of at least the first and second sensor value, which represents a presence of or a value of the substance to be measured in surroundings of the first and second sensors;

recognizing, via a recognition unit, that a combination of the read-in first and second sensor values is outside the threshold value range; and changing, via a changing unit, the threshold value range into a changed threshold value range so that the combination of the read-in first and second sensor values is within the changed threshold value range, the changing of the threshold value range being carried out when the combination of the read-in first and second sensor values meets a change criterion;

wherein the first sensor value and the second sensor value are detected taking into consideration a specific operating parameter, which represents a specific operating mode of the sensor unit or a piece of information about a property of the sensor unit.

2. The method as recited in claim 1, wherein in the reading in step, the threshold value range read in, represents a range in a sensor value space spanned by the at least first and second sensor values.

3. The method as recited in claim 1, wherein the reading in step, the recognizing step, and the changing step are repeatedly carried out, it being recognized in the repeatedly carried out step of recognizing that the combination of the first and second sensor values read in in the repeatedly carried out step of reading in is outside the changed threshold value range.

4. The method as recited in claim 3, wherein in the reading in step, and of the repeatedly carried out step of reading in, further one first operating parameter or one second operating parameter each is read in, the first operating parameter representing an instantaneous operating state of the first sensor and/or an instantaneous operating state of the second sensor, and/or the second operating parameter representing an operating state of the first sensor and/or an operating state of the second sensor for a subsequent point in time, and wherein in the step of changing, the threshold value range further being changed when the first operating parameter read in in the step of reading in deviates by more than a predefined tolerance value from the second operating parameter read in in the repeatedly carried out step of reading in.

5. The method as recited in claim 4, wherein in the step of reading in, a piece of information about an operating voltage and/or an operating temperature and/or an age of the first and/or second sensor is read in as the first operating parameter and/or the second operating parameter.

6. The method as recited in claim 3, wherein in the step of recognizing, the first sensor value, and/or the second sensor value, and/or a first operating parameter and/or a second operating parameter is used for recognizing the combination of the read-in first and second sensor values outside the threshold value range when the first sensor value, and/or the second sensor value, and/or the first operating parameter, and/or the second operating parameter have been recorded at a point in time, which is temporally not more than a predefined time span prior to an instantaneous point in time.

7. The method as recited in claim 1, wherein the changing step is carried out when, as the change criterion, the combination of the read-in first and second sensor values is not more than a predefined or relative distance value outside the threshold value range.

8. The method as recited in claim 1, wherein the changing of the threshold value range is carried out using an algorithm with artificial intelligence and/or an algorithm of a machine learning method.

9. The method as recited in claim 1, wherein the changing step is carried out in response to a user input signal, which represents a manual user input, the user input signal being read in in response to a recognition signal output in the step of recognizing, which represents the recognition of the combination of the read-in first and second sensor values being outside the threshold value range.

10. The method as recited in claim 1, wherein in the reading-in step, the first sensor value and/or the second sensor value is read in as a measured value and/or as a processed measured value from a gas sensor and/or from a sensor for measuring particles in a fluid.

11. The method as recited in claim 10, wherein the fluid is a gas or liquid.

12. The method as recited in claim 10, wherein in the reading in step, at least one further threshold value range is read in, which maps a range of combinations of at least the first and second sensor value, which represents a presence or a value of the further substance to be measured in surroundings of the first and the second sensor, wherein in the recognizing step, it is recognized that the combination of the read-in first and second sensor values is outside the further threshold value range, and in the changing step, the further threshold value range is changed to a changed further threshold value range so that the combination of the read-in first and second sensor values is within the changed further threshold value range.

13. The method as recited in claim 1, wherein in the step of reading in, at least one third sensor value of a third sensor of the sensors of the sensor unit and a fourth sensor value of a fourth sensor of the sensors of the sensor unit are read in, the third sensor value and the fourth sensor value each representing one parameter of the substance to be measured by the sensors or a linking of the parameters and, the recognizing step, it is recognized that a combination of the read-in third and fourth sensor values is outside the threshold value range, and in the changing step, the threshold value range is changed into the changed threshold value range so that the combination of the read-in third and fourth sensor values is within the changed threshold value range.

14. The method as recited in claim 1, wherein the operating parameter maps an age of the sensor unit or of the first sensor and/or of the second sensor, and is linked to the first sensor value and the second sensor value, so as to provide the age of the sensor unit or of the first sensor and/or of the second sensor providing the first sensor value and the second sensor value.

15. The method as recited in claim 1, wherein the operating parameter maps an operating temperature, or a voltage or a heating voltage of the sensor unit or of the first sensor and/or of the second sensor, required for a measurement of the substance to be measured.

16. An apparatus configured to evaluate signals of a sensor unit including at least two sensors, comprising:

a device configured to perform the following:

detecting at least one first sensor value, via a first sensor of the sensors of the sensor unit, and detecting at least one second sensor value of a second sensor of the sensors of the sensor unit;

reading in, via a read-in interface: (i) the at least one first sensor value and the at least one second sensor value, each of the first and second sensor values representing one parameter of a substance to be measured by the sensors or a linking of the parameters, and (ii) a threshold value range which maps a range of combinations of at least the first and second sensor value, which represents a presence of or a value of the substance to be measured in surroundings of the first and second sensors;

recognizing, via a recognition unit, that a combination of the read-in first and second sensor values is outside the threshold value range; and changing, via a changing unit, the threshold value range into a changed threshold value range so that the combination of the read-in first and second sensor values is within the changed threshold value range, the changing of the threshold value range being carried out when the combination of the read-in first and second sensor values meets a change criterion;

wherein the first sensor value and the second sensor value are detected taking into consideration a specific operating parameter, which represents a specific operating mode of the sensor unit or a piece of information about a property of the sensor unit.

17. A non-transitory machine-readable memory medium, on which is stored a computer program, which is executable by a processor, comprising:

a program code arrangement having program code for evaluating signals of a sensor unit including at least two sensors, by performing the following:

detecting at least one first sensor value, via a first sensor of the sensors of the sensor unit, and detecting at least one second sensor value of a second sensor of the sensors of the sensor unit;

reading in, via a read-in interface: (i) the at least one first sensor value and the at least one second sensor value, each of the first and second sensor values representing one parameter of a substance to be measured by the sensors or a linking of the parameters, and (ii) a threshold value range which maps a range of combinations of at least the first and second sensor value, which represents a presence of or a value of the substance to be measured in surroundings of the first and second sensors;

recognizing, via a recognition unit, that a combination of the read-in first and second sensor values is outside the threshold value range; and changing, via a changing unit, the threshold value range into a changed threshold value range so that the combination of the read-in first and second sensor values is within the changed threshold value range, the changing of the threshold value range being carried out when the combination of the read-in first and second sensor values meets a change criterion;

wherein the first sensor value and the second sensor value are detected taking into consideration a specific operating parameter, which represents a specific operating mode of the sensor unit or a piece of information about a property of the sensor unit.

* * * * *